(12) United States Patent
Koh et al.

(10) Patent No.: US 12,014,446 B2
(45) Date of Patent: Jun. 18, 2024

(54) SYSTEMS AND METHODS FOR GENERATING PREDICTED VISUAL OBSERVATIONS OF AN ENVIRONMENT USING MACHINE LEARNED MODELS

(71) Applicant: Google LLC, Mountain View, CA (US)

(72) Inventors: Jing Yu Koh, Singapore (SG);
Honglak Lee, Ann Arbor, MI (US);
Yinfei Yang, Sunnyvale, CA (US);
Jason Michael Baldridge, Austin, TX (US); Peter James Anderson, Austin, TX (US)

(73) Assignee: GOOGLE LLC, Mountain View, CA (US)

( * ) Notice: Subject to any disclaimer, the term of this patent is extended or adjusted under 35 U.S.C. 154(b) by 362 days.

(21) Appl. No.: 17/409,249

(22) Filed: Aug. 23, 2021

(65) Prior Publication Data
US 2023/0072293 A1  Mar. 9, 2023

(51) Int. Cl.
*G06T 11/00* (2006.01)
*G06F 18/213* (2023.01)
(Continued)

(52) U.S. Cl.
CPC ............ *G06T 11/00* (2013.01); *G06F 18/213* (2023.01); *G06N 3/045* (2023.01); *G06N 3/08* (2013.01);
(Continued)

(58) Field of Classification Search
CPC . G06T 11/00; G06T 7/10; G06T 15/00; G06T 15/08; G06T 2207/10028;
(Continued)

(56) References Cited

U.S. PATENT DOCUMENTS

| 9,102,055 | B1 * | 8/2015 | Konolige | ............... B25J 9/1612 |
| 2020/0104640 | A1 * | 4/2020 | Poole | .................. G06F 18/2148 |
| 2021/0295155 | A1 * | 9/2021 | Vijayakumar | ....... G06V 10/774 |

OTHER PUBLICATIONS

Arun Mallya, Ting-Chun Wang, Karan Sapra, and Ming-Yu Liu. World-consistent video-to-video synthesis. ECCV, 2020. (Year: 2020).*

(Continued)

*Primary Examiner* — Nancy Bitar
*Assistant Examiner* — Dustin Bilodeau
(74) *Attorney, Agent, or Firm* — DORITY & MANNING P.A.

(57) ABSTRACT

A computing system for generating predicted images along a trajectory of unseen viewpoints. The system can obtain one or more spatial observations of an environment that may be captured from one or more previous camera poses. The system can generate a three-dimensional point cloud for the environment from the one or more spatial observations and the one or more previous camera poses. The system can project the three-dimensional point cloud into two-dimensional space to form one or more guidance spatial observations. The system can process the one or more guidance spatial observations with a machine-learned spatial observation prediction model to generate one or more predicted spatial observations. The system can process the one or more predicted spatial observations and image data with a machine-learned image prediction model to generate one or more predicted images from the target camera pose. The system can output the one or more predicted images.

17 Claims, 15 Drawing Sheets
(7 of 15 Drawing Sheet(s) Filed in Color)

(51) Int. Cl.
  *G06N 3/045* (2023.01)
  *G06N 3/08* (2023.01)
  *G06T 7/10* (2017.01)
  *G06T 15/00* (2011.01)
  *G06T 15/08* (2011.01)

(52) U.S. Cl.
  CPC ............... *G06T 7/10* (2017.01); *G06T 15/00* (2013.01); *G06T 15/08* (2013.01); *G06T 2207/10028* (2013.01); *G06T 2207/20081* (2013.01)

(58) Field of Classification Search
  CPC ....... G06T 2207/20081; G06T 2210/56; G06T 15/20; G06F 18/213; G06N 3/045; G06N 3/08; G06N 3/094; G06N 3/0455; G06N 3/0464; G06V 10/82; G06V 20/64
  See application file for complete search history.

(56) References Cited

OTHER PUBLICATIONS

Olivia Wiles, Georgia Gkioxari, Richard Szeliski, and Justin Johnson. Synsin: End-to-end view synthesis from a single image. 2020 (Year: 2020).*

Koh et al., "Pathdreamer: A World Model for Indoor Navigation", ICCV 2021 Conference, Oct. 11-17, 2021,Virtual, 18 pages.

* cited by examiner

Input RGB

Input Seg

Input Depth

3D Point Cloud

Seg
Guidance

RGB
Guidance

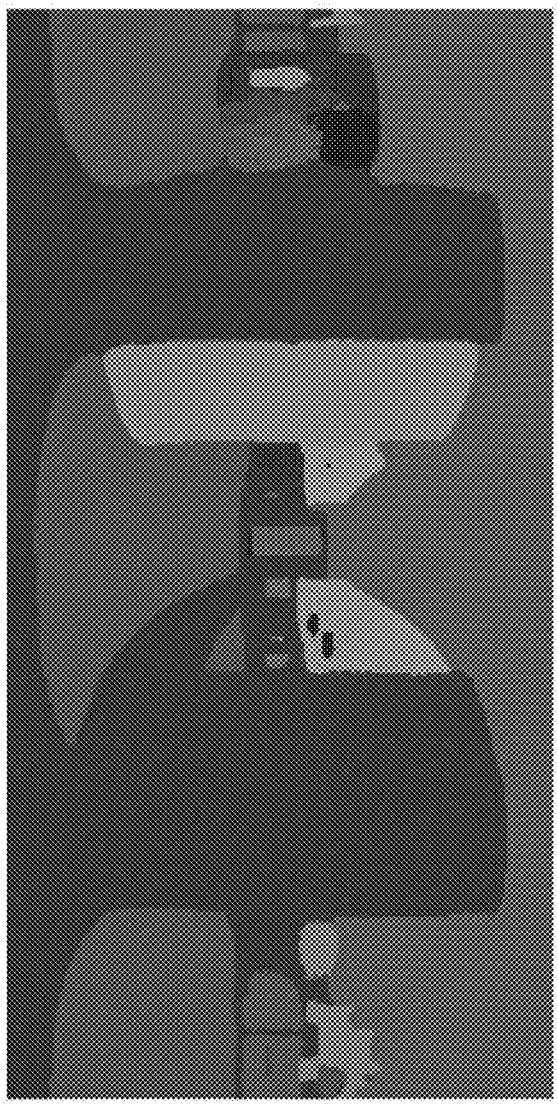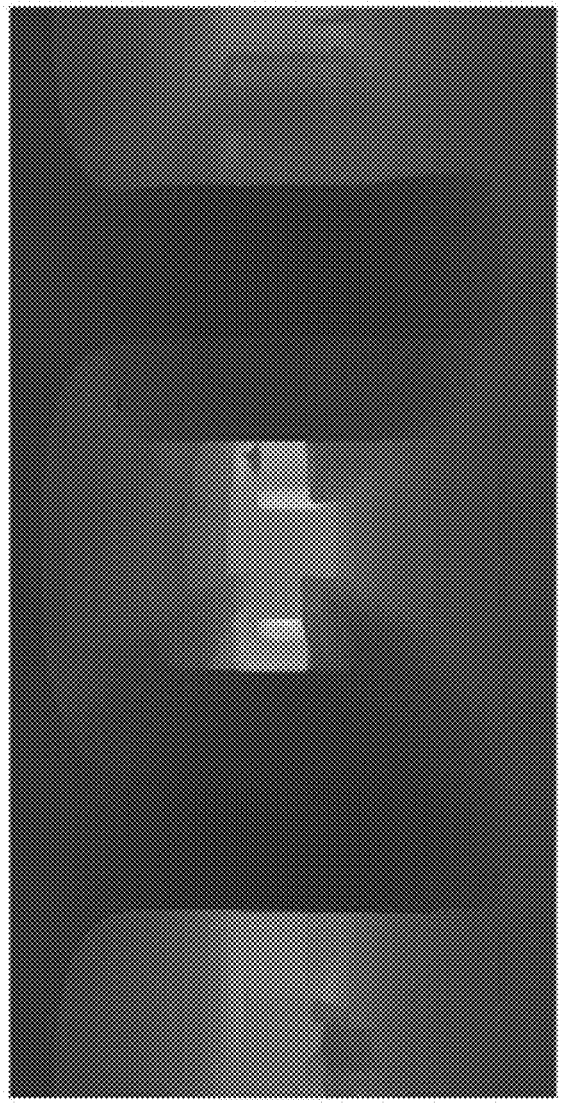
Figure 8G Predicted Seg
Figure 8H Predicted Depth

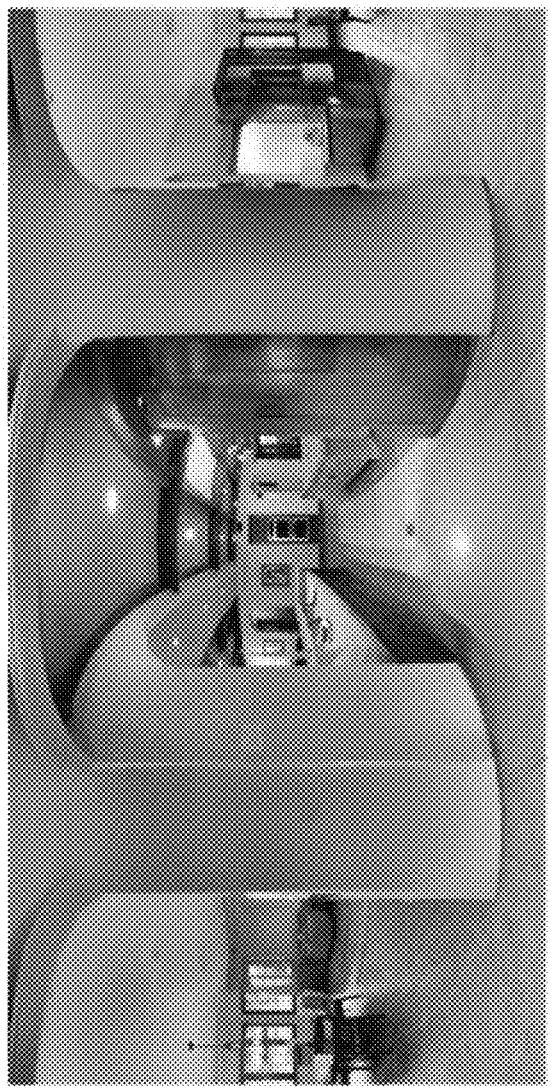
Figure 8I Predicted RGB
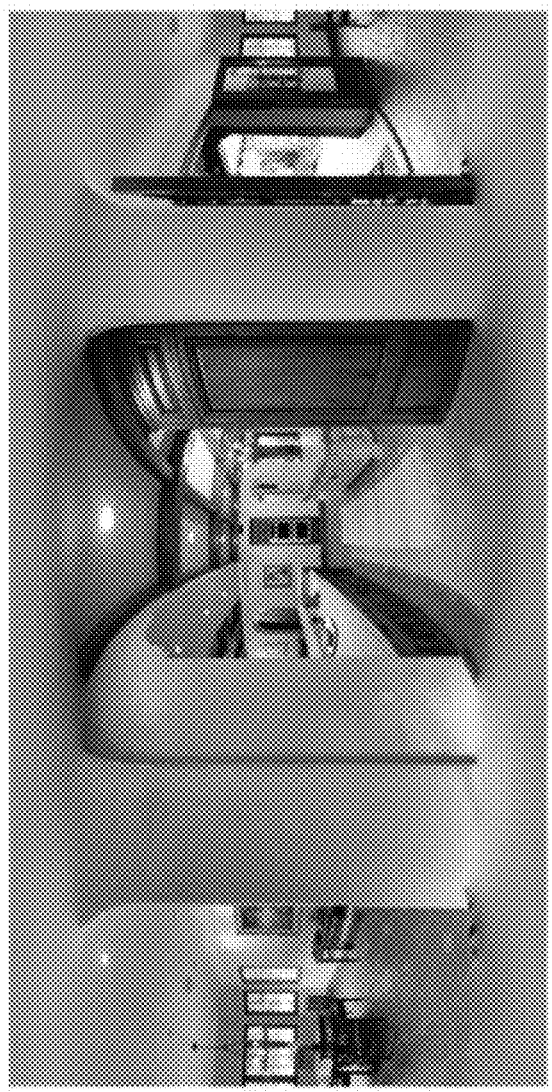
Figure 8J Ground Truth RGB

SYSTEMS AND METHODS FOR GENERATING PREDICTED VISUAL OBSERVATIONS OF AN ENVIRONMENT USING MACHINE LEARNED MODELS

FIELD

The present disclosure relates generally to generating visual observations of an environment. More particularly, the present disclosure relates to systems and methods for generating predicted visual observations of an environment using machine-learned models and training the machine-learned models.

BACKGROUND

World models, or models of environments, are an appealing way to represent a computing agent's knowledge about its surroundings. An agent with a world model can predict its future by predicting the consequences of a series of proposed actions. However, models that generate predicted visual observations have typically been limited to relatively simple environments, such as video games. Previous models have been proposed to represent three-dimensional scenes, including point cloud representations, layered depth images, and mesh representations. A significant drawback of previous models is that they require a large number of input views to render a single scene (e.g., 20-62 images per scene). Furthermore, these models are typically trained to represent a single scene, and currently do not generalize well to unseen environments.

SUMMARY

Aspects and advantages of embodiments of the present disclosure will be set forth in part in the following description, or can be learned from the description, or can be learned through practice of the embodiments.

One example aspect of the present disclosure is directed to a computing system for generating predicted images along a trajectory of unseen viewpoints. The computing system can include one or more processors and one or more non-transitory computer-readable media that store instructions that, when executed by the processors, cause the computing system to perform operations. The operations can include, obtaining one or more spatial observations of an environment that may be captured from one or more previous camera poses. Each of the one or more spatial observations may include one or more depth observations of the environment or one or more semantic segmentation observations of the environment. The operations can include generating, by the computing system, a three-dimensional point cloud for the environment from the one or more spatial observations and the one or more previous camera poses. The operations can include projecting, by the computing system, the three-dimensional point cloud into two-dimensional space to form one or more guidance spatial observations of the environment from a target camera pose that differs from the one or more previous camera poses. Each of the one or more guidance spatial observations of the environment may include one or more depth images or one or more semantic segmentation images. The operations can include processing, by the computing system, the one or more guidance spatial observations with a machine-learned spatial observation prediction model to generate one or more predicted spatial observations of the environment from the target camera pose. Each of the one or more predicted spatial observations may include one or more depth images or one or more semantic segmentation images. Processing the one or more guidance spatial observations with the machine-learned spatial observation prediction model can include processing the one or more guidance spatial observations with an encoder model of the machine-learned spatial observation prediction model. The encoder model may be configured to generate a feature map from the one or more guidance spatial observations. Processing the one or more guidance spatial observations with the encoder model may include inputting a one-hot encoding of the one or more guidance spatial observations to the encoder model to receive the feature map. Processing the one or more guidance spatial observations with the machine-learned spatial observation prediction model can include sampling a latent spatial noise tensor from a noise distribution. The noise distribution may be a multivariate Gaussian distribution. Processing the one or more guidance spatial observations with the machine-learned spatial observation prediction model can include combining the feature map with the latent spatial noise tensor to generate a combined feature set. Processing the one or more guidance spatial observations with the machine-learned spatial observation prediction model can include processing the combined feature set with a decoder model of the machine-learned spatial observation prediction model. The decoder model may be configured to generate the one or more predicted spatial observations of the environment from the target camera pose. The encoder model may provide spatial information to the decoder model utilizing skip connections. The operations can include processing the one or more predicted spatial observations and image data associated with one or more images of the environment captured from the one or more previous camera poses with a machine-learned image prediction model to generate one or more predicted images of the environment from the target camera pose. The image data associated with the one or more images of the environment captured from the one or more previous camera poses may include a guidance image. The images of the environment may be RGB color images. The guidance image may include one or more images of the environment captured from the one or more previous camera poses projected onto the three-dimensional point cloud from the target camera pose. The operations can include outputting the one or more predicted images.

Another example aspect of the present disclosure is directed to a computer-implemented method for learning an improved noise distribution. The computer implemented method can include generating, by a computing system, one or more guidance spatial observations of an environment from a target camera pose. Generating the one or more guidance spatial observations of an environment from a target pose can include obtaining, by the computing system, one or more spatial observations of the environment that have been captured from the one or more previous camera poses that may differ from the target camera pose. Generating the one or more guidance spatial observations of an environment from a target pose can include generating, by the computing system, a three-dimensional point cloud for the environment from the one or more spatial observations and the one or more previous camera poses. Generating the one or more guidance spatial observations of an environment from a target pose can include projecting, by the computing system, the three-dimensional point cloud into two-dimensional space to form the one or more guidance spatial observations of the environment from target camera pose. The computer-implemented method can include processing, by the computing system, the one or more guidance spatial observations with a first encoder model to generate a guidance spatial observations feature map. Processing, by the computing system, the one or more guidance spatial observations with the first encoder model to generate the guidance spatial observations feature map can include inputting, by the computing system, a one-hot encoding of the one or more guidance spatial observations to the first encoder model to generate the guidance spatial observations feature map. The computer-implemented method can include processing, by the computing system, one or more ground truth spatial observations of the environment from the target camera pose with a second encoder model to generate a ground truth spatial observations feature map. Processing, by the computing system, the one or more ground truth spatial observations with the second encoder model to generate the ground truth spatial observations feature map may include inputting, by the computing system, a one-hot encoding of the one or more ground truth spatial observations to the second encoder model to generate the ground truth observations feature map. The first encoder model and the second encoder model may include weights, and the weights may be shared between the first encoder model and the second encoder model. The computer-implemented method can include processing, by the computing system, the guidance spatial observations feature map with a first distribution prediction model to generate one or more guidance spatial observation distribution values for a guidance spatial observation distribution. The first distribution prediction model can include a first convolutional neural network, and the guidance spatial observation distribution can include a first multivariate Gaussian distribution. The computer-implemented method can include processing, by the computing system, the ground truth spatial observations feature map with a second distribution prediction model to generate one or more ground truth observation distribution values for a ground truth observation distribution. The second distribution prediction model can include a second convolutional neural network, and the ground truth observation distribution can include a second multivariate Gaussian distribution. The computer-implemented method can include evaluating, by the computing system, a loss function that compares the guidance spatial observation distribution and the ground truth observation distribution. The loss function can include a Kullback-Leibler divergence function. The computer-implemented method can include modifying, by the computing system, one or more parameters of at least the first encoder model based on the loss function. Modifying, by the computing system, the one or more parameters of at least the first encoder model based on the loss function can include modifying the second distribution prediction model based on the loss function.

Another example aspect of the present disclosure is directed to a computer-implemented method for training a machine-learned spatial observation prediction model. The computer-implemented method may include obtaining, by a computing system, one or more spatial observations of an environment that have been captured from one or more previous camera poses. The one or more spatial observations of an environment may include one or more depth observations or one or more semantic segmentation observations. The computer-implemented method can include generating, by the computing system, a three-dimensional point cloud for the environment from the one or more spatial observations and the one or more previous camera poses. The computer-implemented method can include projecting, by the computing system, the three-dimensional point cloud into two-dimensional space to form one or more guidance spatial observations of the environment from a target camera pose that may differ from the from the one or more previous camera poses. The computer-implemented method can include processing, by the computing system, the one or more guidance spatial observations with a machine-learned spatial observation prediction model to generate one or more predicted spatial observations of the environment from the target camera pose. The computer-implemented method can include evaluating, by the computing system, a loss function that compares the one or more predicted spatial observations to a ground truth spatial observations of the environment from the target camera pose. The loss function may include a mean absolute error function or a cross entropy loss function. The mean absolute error function may generate a mean absolute error. The cross-entropy function may generate a cross entropy loss. The computer-implemented method can include modifying, by the computing system, one or more values of one or more parameters of the machine-learned spatial observation prediction model based on the loss function.

Another example aspect of the present disclosure is directed to a computer-implemented method for training a machine-learned image prediction model. The computer-implemented method can include generating, by a computing system, one or more predicted spatial observations of an environment from a target camera pose. The computer-implemented method can include processing, by the computing system, the one or more predicted spatial observations and image data associated with one or more images of the environment captured from the one or more previous camera poses with a machine-learned image prediction model to generate one or more predicted images of the environment from the target camera pose. The one or more predicted spatial observations may be predicted depth observations or predicted semantic segmentation observations. The images of the environment may be RGB color images. The machine-learned image prediction model may include one or more convolution blocks or one or more one or more image synthesis layers. The image synthesis layers may be configured to receive data from the one or more convolution blocks. The computer-implemented method can include evaluating, by the computing system, a loss function that compares the one or more predicted images of the environment from the target camera pose to a ground truth image of the environment from the target camera pose. The loss function may include a hinge loss function, a feature mapping function, or a perceptual loss function. The computer-implemented method may include modifying, by the computing system, one or more values of one or more parameters of the machine-learned image prediction model based on the loss function.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Detailed discussion of embodiments directed to one of ordinary skill in the art is set forth in the specification, which makes reference to the appended figures, in which:

FIGS. 8G-H depict example predicted observations according to example aspects of the present disclosure.

FIG. 8I depicts an example predicted image of an environment according to example aspects of the present disclosure.

FIG. 8J depicts an example ground truth image for a scene according to example aspects of the present disclosure.

Figure 1A:
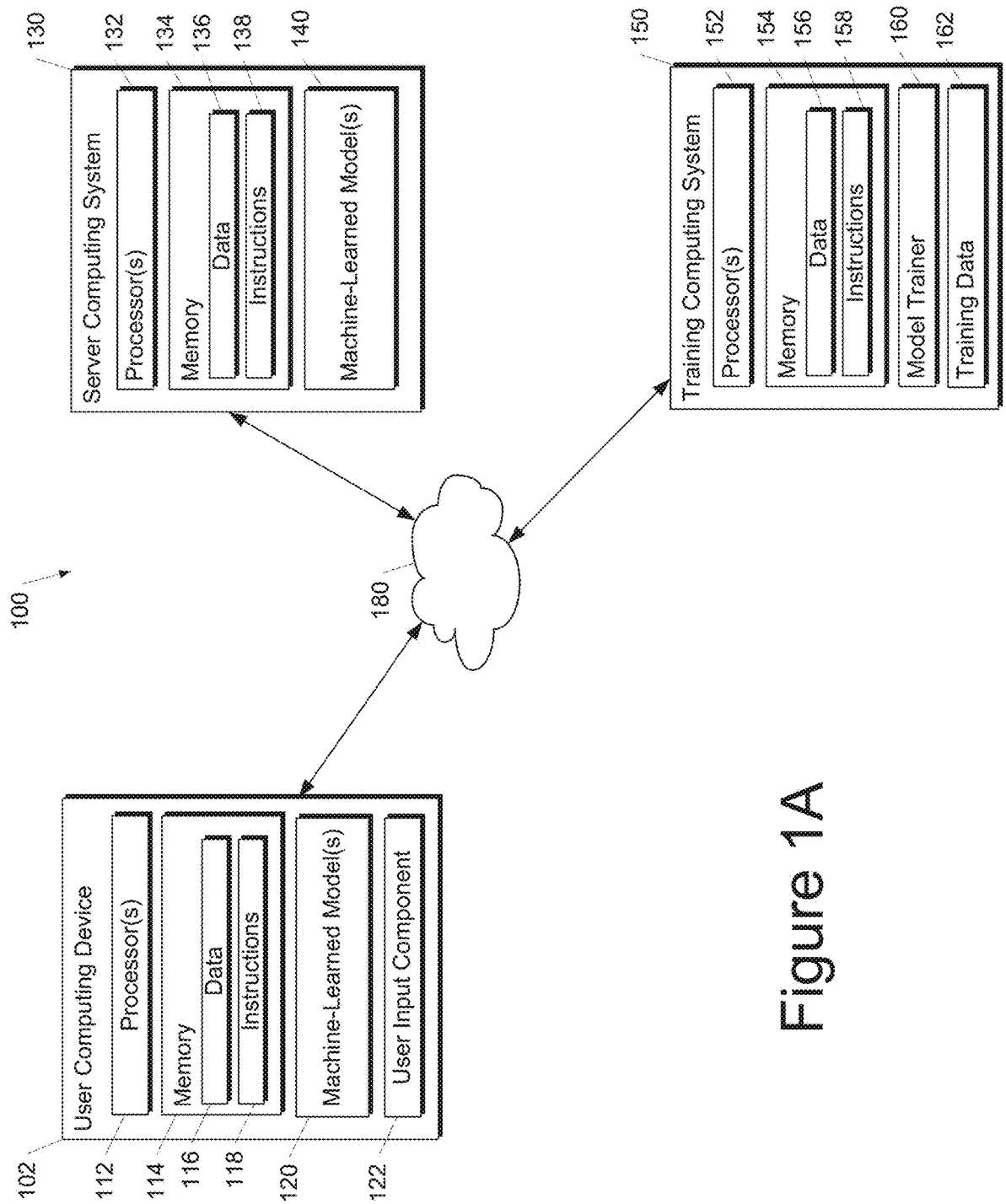
FIG. 1A depicts a block diagram of an example computing system that generates predicted visual observations of an environment according to example embodiments of the present disclosure.

Reference numerals that are repeated across plural figures are intended to identify the same features in various implementations.

DETAILED DESCRIPTION

Overview

Generally, the present disclosure is directed to systems and methods for generating predicted observations of an environment from multiple unobserved viewpoints. To do so, the present disclosure describes a machine-learned model (e.g., visual world model) trained to generate predicted visual observations for viewpoints that have not been visited based on one or more previous observations of an environment (e.g., a scene). The visual world model can generate one or more predicted visual observations along a trajectory based on a proposed navigation action sequence. The visual world model can be trained such that the predicted visual observations can be generated for environments not seen during training.

The input to the visual world model can include a sequence of previous observations and corresponding camera poses. Observations, as used throughout this specification, can include depth observations (e.g., depth images), semantic segmentation observations (e.g., semantic segmentation images), and/or image observations (e.g., color images, RGB images). Depth observations can include information descriptive of the distance between a viewpoint and a plurality of points in an environment. Semantic segmentation observations can include information descriptive of one or more object classifications of objects of an environment. Image observations can contain data descriptive of the colors of objects of an environment. In some implementations, the sequence of corresponding camera poses is available from an odometry system. Camera intrinsics (e.g., a matrix that converts between the two-dimensional camera plane and the three-dimensional world coordinate space) can be known or estimated.

Example implementations of the present disclosure can generate completions of partially visible objects from potentially unbounded viewpoint changes. The partially visible objects can be generated using as few as one previous observation. Further, example implementations of the present disclosure can provide for solving the relatively more difficult challenge of predicting around corners. For example, given a future navigation trajectory passing the entrance of an unseen room, example implementations of the present disclosure can generate predicted visual observations spanning the entire contents of that room. The visual world model described herein can generate predictions that can be both temporally consistent and stochastic (e.g., the predictions can capture the full distribution of possible outcomes). Thus, revisited regions can be rendered in a consistent manner to previous observations.

In some implementations, the visual world model can include a hierarchical two-stage model. At a first stage (e.g., a structure generator stage) the model can generate a new depth image and/or segmentation image to provide a plausible high-level representation of an environment. The first stage can use previous semantic segmentation images and/or depth images for context. At a second stage (e.g., an image generator stage) the model can receive from the first stage the predicted semantic and/or depth images and render them into one or more realistic RGB images. The second stage can use previous RGB images as context. In some implementations, one or more stages can accumulate previous observations as one or more three-dimensional point clouds. The one or more three-dimensional point clouds can be re-projected into two-dimensional space from a target camera pose to provide context to future predictions.

Example implementations of the present disclosure have several possible applications including, for example, video editing, content creation, and model-based methods for artificial intelligence tasks (e.g., navigating to objects, instruction-guided navigation, dialog-guided navigation, etc.). Some example implementations of the present disclosure can be used, for example, for sampling-based planning, for learning policies directly from a model, and/or for counterfactual reasoning. Additionally, or alternatively, example implementations of the present disclosure may improve the sample efficiency of deep reinforcement learning.

In an example implementation, predicted observations generated by the visual world model described herein can improve performance on a downstream visual navigation task (e.g., vision-and-language navigation (VLN)). Reaching a navigation goal involves successfully grounding natural language instructions to visual observations, this provides a challenging task-based assessment of prediction quality. In an example implementation, at each step while moving through the environment, a baseline VLN agent can generate a large number of possible future trajectories using a beam search. These alternative trajectories can be ranked using an instruction-trajectory compatibility model to assess which trajectory best matches the instruction. The agent can then execute a first action from the top-ranked trajectory. The agent can then repeat the process. Three different planning horizons can be used, with future trajectories including 1, 2, or 3 forward steps.

The instruction-trajectory compatibility model can be a dual-encoder that separately encodes textual instructions and trajectories (e.g., encoded using visual observations and path geometry) into a shared latent space. Performance on incomplete paths can be improved by introducing truncated paths into the original contrastive training scheme. In some examples, the compatibility model is trained using only ground truth observations. Observations for future steps can be drawn from multiple sources including ground truth (e.g., observations from the actual environment, look ahead observations), the visual world model described herein, and/or a repeated panorama (e.g., a baseline in which the most recent observation is repeated in future steps). The geometry of future trajectories can be determined by ground truth navigation graphs.

The systems and methods of the present disclosure provide a number of technical effects and benefits. As one example, the systems and methods can generate high-resolution visual observations (e.g., RGB observations, semantic segmentation observations, depth observations) of an environment (e.g., a scene) for viewpoints that have not yet been visited, using as few as one previous observation. Additionally, or alternatively, the systems and methods can generate the observations in environments that have not been seen during training. These improvements can result in less initial observations of an environment necessary to generate predicted observations during an inference phase. Fewer initial observations can result in less processor usage, memory usage, storage usage, and network bandwidth required to generate a predicted observation. The ability to generate a predicted observation of an environment without training the model on that particular environment can also result in less processor usage, memory usage, storage usage, and network bandwidth required to generate a predicted observation. Additionally, the systems and methods of the present disclosure provide a practical improvement to computing technology such as, for example, machine-learning techniques by increasing the efficiency of VLN tasks and deep reinforcement learning ultimately reducing the use of computing resources.

With reference now to the Figures, example embodiments of the present disclosure will be discussed in further detail.

Example Devices and Systems

FIG. 1A depicts a block diagram of an example computing system 100 that performs visual observation prediction according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more visual world models 120. For example, the visual world models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example visual world models 120 are discussed with reference to FIGS. 2-3.

In some implementations, the one or more visual world models 120 can be received from the server computing system 130 over network 180, stored in the user computing device memory 114, and then used or otherwise implemented by the one or more processors 112. In some implementations, the user computing device 102 can implement multiple parallel instances of a single visual world model 120 (e.g., to perform parallel predictions of visual observations across multiple instances of the visual world model 120).

More particularly, the visual world models can be used to generate one or more predicted visual observations (e.g., semantic segmentation image predictions, depth image predictions, and/or RGB image predictions) along a trajectory based on a proposed navigation action sequence for viewpoints that have not been visited based on one or more previous observations of an environment.

Additionally, or alternatively, one or more visual world models 140 can be included in or otherwise stored and implemented by the server computing system 130 that communicates with the user computing device 102 according to a client-server relationship. For example, the visual world models 140 can be implemented by the server computing system 140 as a portion of a web service (e.g., a visual observation prediction service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more visual world models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 2-3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, Kullback-Leibler (KL) divergence loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, 360-degree panoramas in equirectangular format and a three-dimensional textured mesh annotated with semantic classes. Feasible trajectories can be defined using navigation graphs in which nodes can correspond to panoramic image locations and edges can define navigable state transitions. The first and second stages of the visual world model can be trained separately or jointly. The first stage can be trained with rendered ground-truth depth and semantic images. The training data can be augmented by perturbing the viewpoint coordinates with a random Gaussian noise vector (e.g., N(0,0.2m)) independently along each three-dimensional axis. The second stage can be trained with RGB panoramas, rendered ground-truth depth images, and/or semantic segmentation images. The training data can be augmented by randomly chopping and horizontally rolling the panoramas.

The model trainer can train the visual world models using a training dataset. One example training dataset contains a significant number of RGB-D images from a number of different building-scale indoor environments. For each environment, the training dataset can also include a textured three-dimensional mesh which is annotated with a number of different semantic classes of objects and building components. A plurality of trajectories can be sampled from the dataset and for each trajectory a plurality of panoramas can be sampled, choosing the starting node and the edge transitions uniformly at random. The viewpoints in these trajectories can be, for example, two meters apart from each other.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output (e.g., semantic segmentation image). As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output (e.g., predicted observation).

In some implementations, the input to the machine-learned model(s) of the present disclosure can be text or natural language data (e.g., vision-and-language navigation instructions). The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data (e.g., vision-and-language navigation instructions). The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent noise tensor). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data (e.g., observation distribution). Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data (e.g., distance information, LIDAR). The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images (e.g., observations) and the task is an image processing task (e.g., observation prediction). For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation (e.g., semantic segmentation image), where the image processing output defines, for each pixel in the one or more images, a respective likelihood for each category in a predetermined set of categories. For example, the set of categories can be foreground and background. As another example, the set of categories can be object classes. As another example, the image processing task can be depth estimation (e.g., depth images), where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
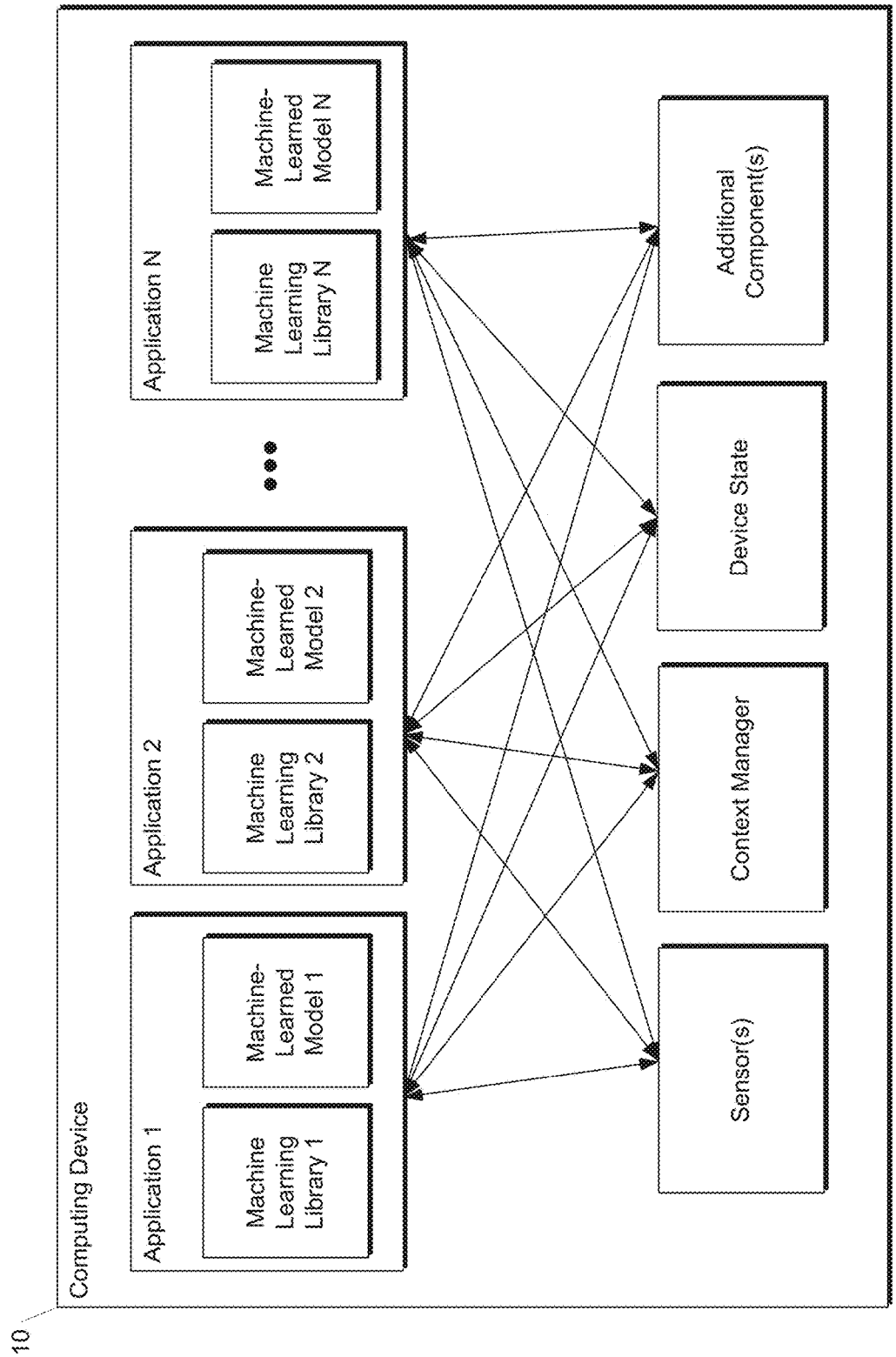
FIG. 1B depicts a block diagram of an example computing device that generates predicted visual observations of an environment according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
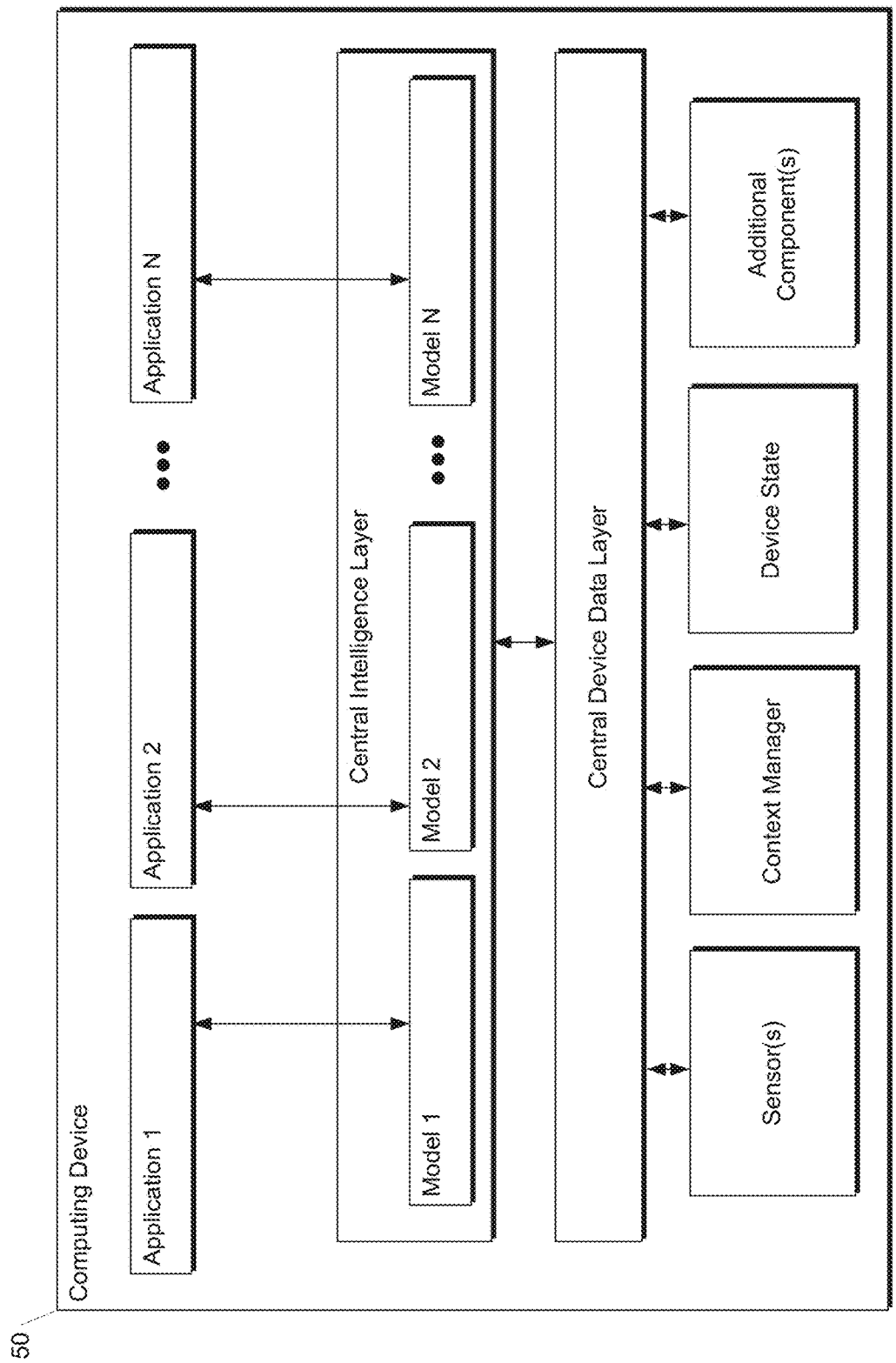
FIG. 1C depicts a block diagram of an example computing device that generates predicted visual observations of an environment according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Image Prediction System

Figure 1D:
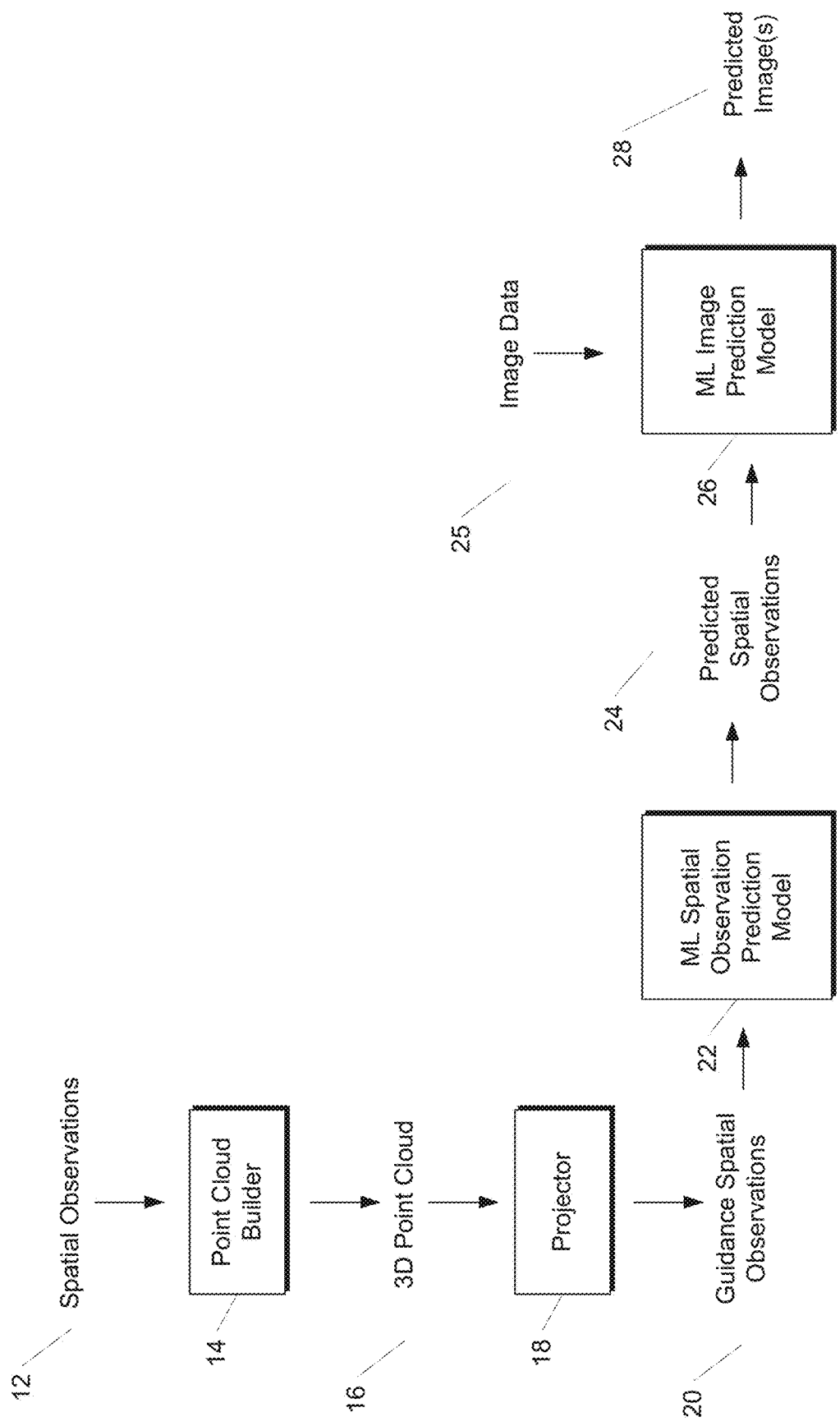
FIG. 1D depicts a block diagram of an example pipeline for generating predicted images along a trajectory of unseen viewpoints according to example embodiments of the present disclosure.

FIG. 1D depicts a block diagram of an example system for generating predicted images along a trajectory of unseen viewpoints.

The example system illustrated in FIG. 1D can obtain one or more spatial observations 12 of an environment that have been captured from one or more previous camera poses. The system can generate (e.g., by execution of a point cloud builder 14 encoded in computer-readable instructions) a three-dimensional point cloud 16 for the environment from the one or more spatial observations 12 and the one or more previous camera poses. The system can project (e.g., by execution of a projector 18 encoded in computer-readable instructions) the three-dimensional point cloud 16 into two-dimensional space to form one or more guidance spatial observations 20 of the environment from a target camera pose that differs from the one or more previous camera poses.

A machine-learned spatial observation prediction model 22 can process the one or more guidance spatial observations 20 to generate one or more predicted spatial observations 24 of the environment from the target camera pose. Next, a machine-learned image prediction model 26 can process the one or more predicted spatial observations 24 and image data 25 associated with one or more images of the environment captured from the one or more previous camera poses to generate one or more predicted images 28 of the environment from the target camera pose. The system can output the one or more predicted images 28.

Example Structure Generation Stage

Figure 2:
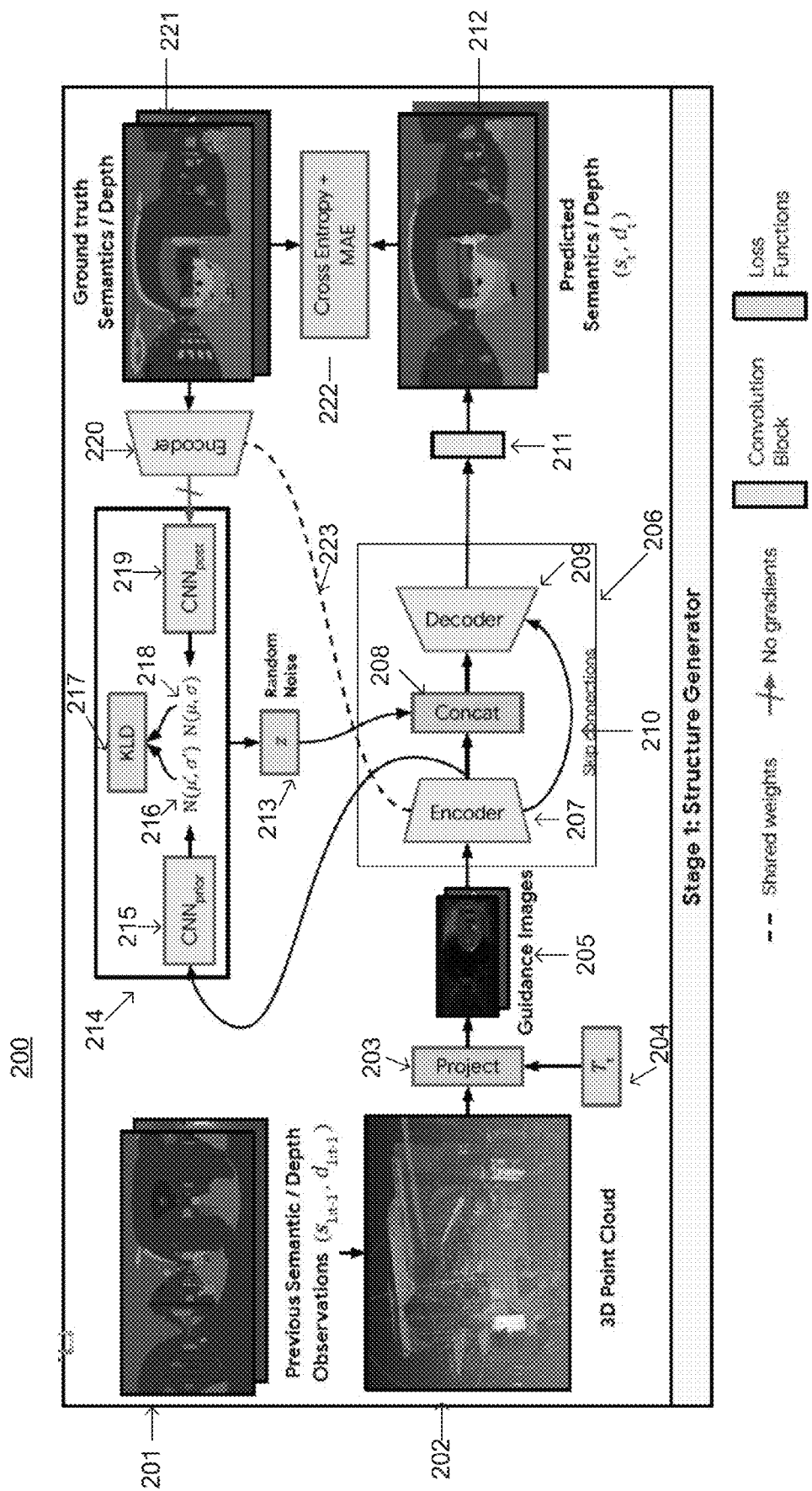
FIG. 2 depicts a block diagram of an example first stage of an example visual world model according to example embodiments of the present disclosure.

Example implementations of the present disclosure provide for a first stage (e.g., a structure generator stage) suitable for generating one or more predicted observations (e.g., segmentation image(s) $\widehat{s_t}$ and/or depth image(s) $\widehat{d_t}$ ). One example structure generator 200 is illustrated in FIG. 2. The structure generator can receive as input one or more spatial observations of an environment 201 that have been captured from one or more previous camera poses $T_{1:t-1}$. The spatial observations 201 can include depth image(s) $d_{1:t-1}$ and/or semantic segmentation image(s) $s_{1:t-1}$. The structure generator can generate a three-dimensional point cloud 202 for the environment from the one or more spatial observations 201 and the one or more previous camera poses. The structure generator can re-project the three-dimensional point cloud back into two-dimensional space 203 to form one or more guidance spatial observations (e.g., guidance depth image(s) $d'_t$ and/or guidance semantic segmentation image(s) $s'_t$) 205 of the environment from a target camera pose $T_t$ 204 that differs from the one or more previous camera poses.

The structure generator can process the one or more guidance spatial observations 205 with a machine-learned spatial observation prediction model to generate one or more predicted spatial observations of the environment from the camera pose (e.g., predicted depth image(s) $\widehat{d_t}$ and/or predicted semantic segmentation image(s) $\widehat{s_t}$) 212. The machine-learned spatial observation prediction model can contain an encoder-decoder model 206. See, e.g., Jindong Jiang et al., *RedNet: Residual Encoder-Decoder Network for indoor RGB-D Semantic Segmentation* (2018), https://arxiv.org/pdf/1806.01054.pdf. In some implementations, the encoder-decoder model can use transposed convolutions for upsampling in the decoder 211 and/or skip connections between the encoder 207 and decoder 209 to preserve spatial information. The machine-learned spatial observation prediction model can process the one or more guidance spatial observations with an encoder model 207.

In some implementations, the encoder model can receive as input a one-hot encoding of semantic guidance image(s) 205, which may be formally represented as $s'_t \in R^{W \times H \times C}$. In some implementations, the encoder model can receive as input a one-hot encoding of depth guidance image(s) 205, which may be formally represented as $d'_t \in R^{W \times H \times 1}$. In yet another implementation, the encoder model can receive as input a concatenation of the one-hot encoding of both the semantic guidance image(s) and the depth guidance image(s). The encoder model can be configured to generate a feature map from the one or more guidance spatial observations. In some implementations, the encoder-decoder model is not pretrained.

A latent spatial noise tensor (e.g., random noise tensor) $z_t$ 213 can be introduced into the model in between the encoder model 207 and decoder model 209 by concatenating 208 the latent spatial noise tensor with the feature map generated by the encoder model. The latent spatial noise tensor 213 can be generated by a machine-learned noise generation model 214. The decoder model 209 can process the combined feature map to generate the one or more predicted spatial observations (e.g., predicted segmentation image(s) $\widehat{s_t}$ and/or predicted depth image(s) $\widehat{d_t}$) of the environment from the target camera pose 212. In some implementations, the output of the decoder model 209 can be processed with a convolution block 211. Predicted semantic segmentation observations can be processed with a C-way softmax function. Predicted depth observations can be processed with a sigmoid function and normalized in the range (0,1). At each step during an inference phase, the predicted observations can be back-projected and added to the three-dimensional point cloud to assist future predictions.

In some implementations, the latent spatial noise tensor can be generated by sampling from an improved noise distribution (e.g., a conditional prior noise distribution) 216, which may be formally represented as $p_\psi(z_t|s'_t, d'_t)$. There are many possible scenes that may be generated for an unseen region; thus, the latent spatial noise tensor can carry the stochastic information about the next observation that the deterministic encoder may not be able to capture.

During a training phase, one or more spatial observations of an environment can be captured from one or more previous camera poses that differ from a target camera pose 201. A three-dimensional point cloud can be generated for the environment from the one or more spatial observations and the one or more previous camera poses 202. The three-dimensional point cloud can be projected back into two-dimensional space 203 to form one or more guidance spatial observations 205 of the environment from the target camera pose 204. The one or more guidance spatial observations can be processed with a first encoder model 207 to generate a guidance spatial observations feature map. One or more ground truth spatial observations of the environment 221 can be obtained from the target camera pose 204 and processed with a second encoder model 220 to generate a ground truth spatial observations feature map 219. The guidance spatial observations feature map, and the ground truth observations feature map can be further processed by distribution prediction models to generate one or more guidance spatial observation distribution values 216 for a guidance spatial observation distribution and one or more ground truth spatial observation distribution values 218 for a ground truth spatial observation distribution, respectively.

A loss function can be used to compare the guidance spatial observation distribution and the ground truth observation distribution to generate a loss value 217. One or more parameters of at least the first encoder model can be modified based on the loss value. One or more parameters of the second distribution prediction model can also be modified based on the loss value.

For example, a prior distribution 216 can be forced to become close to a posterior distribution 218 by a KL-divergence loss function 217. The posterior distribution is generated by the output of a first encoder model 207 and the posterior distribution is generated from the output of a second encoder model 220 which can receive as input ground truth semantic segmentation and/or depth observations. The first encoder model and the second encoder model can include shared weights 223. The distributions can be modeled using three-layer convolutional neural networks 215, 219 that take their input from an encoder and output two channels representing μ and a to parametrize multivariate Gaussian distributions $\mathcal{N}(\mu, a)$ 216, 218.

In some implementations, the overall structure generator can be trained to minimize a joint loss including a cross entropy loss $L_{ce}$ for semantic predictions, a mean absolute error term for depth predictions, and/or the KL-divergence term for the noise tensor. This may be represented formally as:

$$\mathcal{L}_{Structure} = \lambda_{ce} L_{ce}(s_t, \hat{s}_t)$$

$$+ \lambda_d \|d_t - \hat{d}_t\|_1$$

$$+ \lambda_{KL} D_{KL}(q_\phi(z_t | s_t, d_t), p_\psi(z_t | s'_t, d'_t))$$

where $\lambda_{ce}$, $\lambda_d$, and $\lambda_{KL}$ can represent weights which can be, for example, determined by a grid search. These weights can, for example, be set to 1, 100, and 0.5, respectively.

During an inference phase, the latent noise tensor can be sampled from a previously learned improved noise distribution 216, also referred to as a prior distribution, and the posterior distribution 218 is not used. Circular padding can be used (e.g., on the image x-axis) to avoid heading discontinuities during inference. The resolution (e.g., 512×256) of the semantic segmentation and/or depth outputs can be upsampled to a higher resolution (e.g., 1024×512) using interpolation (e.g., nearest neighbor interpolation). In some implementations, the latent spatial noise tensor can be set to the mean of the conditional prior noise distribution.

In some implementations, machine-learned models 206 and 214 can together correspond to the machine-learned spatial observation prediction model 22 of FIG. 1D.

Example Image Generator

Figure 3:
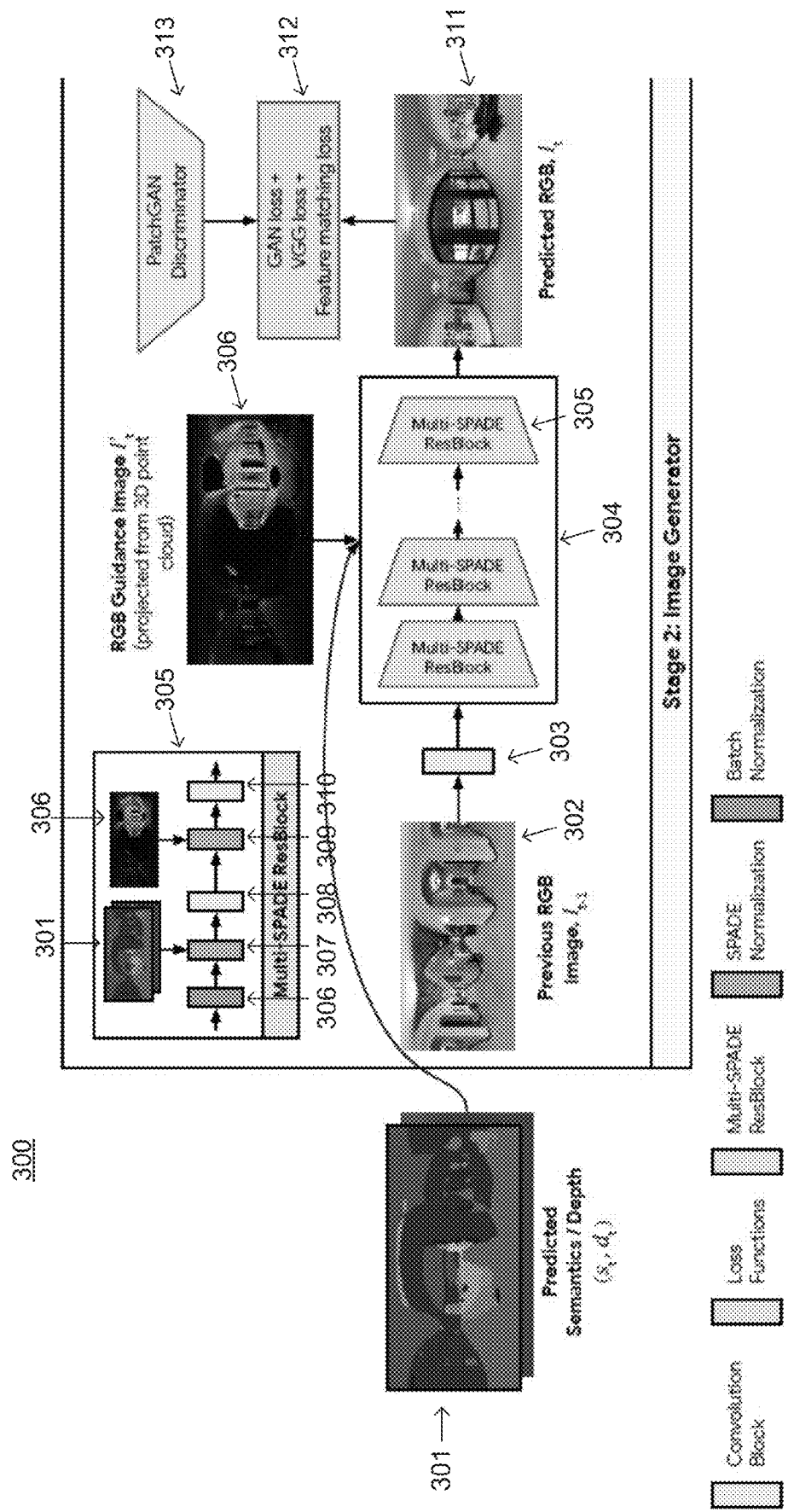
FIG. 3 depicts a block diagram of an example second stage of an example visual world model according to example embodiments of the present disclosure.

FIG. 3 depicts an example second stage (e.g., an image generator stage) 300 suitable for generating realistic image (s) (e.g., RGB image(s)) $\hat{I}_t$ from predicted semantic segmentation observations $\hat{s}_t$ and/or depth observations $\hat{d}_t$. The image generator can receive, as input, predicted observations of an environment 301 from, for example, the structure generator, and image data associated with the one or more images of the environment. The image data can include, for example, a guidance image (e.g., a RGB guidance image) $I'_t$ 306 generated by back-projecting an RGB three-dimensional point cloud including previous RGB image(s) from a target camera pose. The image generator can process the one or more predicted spatial observations and image data associated with the one or more images of the environment captured from the one or more previous camera poses with a machine-learned image prediction model to generate one or more predicted images of the environment from the target camera pose.

The machine-learned image prediction model can contain one or more convolution blocks 303 and one or more image synthesis layers 304. The image synthesis layers can be configured to receive data from the one or more convolution blocks. In some example implementations, the machine-learned image prediction model can use one or more residual blocks 305 for image synthesis. See, e.g., Taesung Park et al., *Semantic Image Synthesis with Spatially-Adaptive Normalization*, in 2019 *IEEE/CVF Conference on Computer Vision and Pattern Recognition* 2332 (2019). The residual blocks can use spatially-adaptive normalization layers 307 to insert context into multiple layers of the model. The residual blocks can contain one or more normalization layers 307, 309. For example, each residual block can contain a normalization layer conditioned on the semantic and/or depth inputs 307, and a normalization layer conditioned on the guidance image 306. The sparsity of the guidance image(s) can be handled by applying partial convolutions 308, 310. In some implementations, the image generator can include seven residual blocks 305, preceded by a single convolution block 303. Circular padding can be used on the image (e.g., the image x-axis) to avoid heading discontinuities during inference.

During a training phase, one or more predicted spatial observations of an environment from a target camera pose can be generated 301. The one or more predicted spatial observations and image data associated with one or more images of the environment captured from one or more previous camera poses can be processed to generate one or more predicted images of the environment from the target camera pose 311. A loss function 312 that compares the one or more predicted images of the environment to ground truth image(s) of the environment from the target camera pose can be used to evaluate a loss value. The loss function 312 can contain a hinge loss function, a feature matching loss function, and/or a perceptual loss function. One or more values of one or more parameters of the machine-learned image prediction model can be modified based on the loss value.

Particularly, the model can be trained with various machine-learning techniques. For example, the model can include a generative adversarial network (GAN) trained via one or more generative adversarial techniques. See, e.g., Phillip Isola et al., *Image-to-Image Translation with Conditional Adversarial Networks*, in 2017 *IEEE Conference on Computer Vision and Pattern Recognition* 5967 (2017). The GAN can include a model that can learn a mapping from an input image (e.g., predicted observation, ground truth observation) and a random noise vector to an output image. The GAN can include a generator model that can be trained to produce outputs that cannot be distinguished from the input images by an adverarially trained discriminator model, which is trained to do as well as possible at discriminating between the input images and the output of the generator model. The discriminator can be configured to only penalize structure at the scale of patches. See, e.g., id. at 5969-5970. A loss function associated with one or more GANs can include a hinge loss function and/or a feature matching loss function. See, e.g., Ting-Chun Wang et al., *High-Resolution Image Synthesis and Semantic Manipulation with Conditional GANs*, in 2018 *IEEE Conference on Computer Vision and Pattern Recognition* 8798 (2018).

In some implementations, the model can also be trained with a perceptual loss from a pretrained VGG-19 model. See, e.g., Justin Johnson et al., *Perceptual Losses for Real-Time Style Transfer and Super-Resolution* (2016), https://arxiv.org/pdf/1603.08155.pdf.

For example, the model can be trained with a generative adversarial network model hinge loss, feature mapping (FM) loss, and a perceptual loss from a pretrained VGG-19 model. During training, the image generator can be provided ground-truth semantic segmentation image(s) and/or ground-truth depth image(s). The GAN 313 can receive, as input, the concatenation of the ground-truth image $I_t$ or generated image $\hat{I}_t$, the ground-truth depth image $d_t$, and/or the ground-truth semantic segmentation image $s_t$. In some implementations, the discriminator only penalizes structure at the scale of patches.

The losses L for the generator G and the discriminator D may be represented formally by $$\mathcal{L}_G = -\lambda_{GAN} \mathbb{E}_{x_t}[D(G(x_t))] +$$

$$\lambda_{VGG} \sum_{i=1}^{n} \frac{1}{n} \|\phi^{(i)}(I_t) - \phi^{(i)}(G(x_t))\|_1 + \lambda_{FM} \sum_{i}^{n} \frac{1}{n} \|D^{(i)}(I_t) - D^{(i)}(G(x_t))\|_1$$

$$\mathcal{L}_D = -\mathbb{E}_{x_t}[\min(0, -1 + D(I_t))] - \mathbb{E}_{x_t}[\min(0, -1 - D(G(x_t)))]$$

where $x_t=(s_t, d_t, I'_t)$ denotes the complete set of inputs to the generator, $\phi^{(i)}$ denotes the intermediate output of the $i^{th}$ layer of the pretrained VGG-19 network, $D^{(i)}$ denotes the output of the discriminator's i-th layer, and the conditioning inputs $s_t$, $d_t$ to the discriminator have been dropped to save space. $\lambda_{GAN}$, $\lambda_{VGG}$, and $\lambda_{FM}$ can represent weights for the generative adversarial network model (GAN) hinge loss, VGG model perceptual loss, and the feature matching model, respectively.

In some implementations, components 303 and 304 of FIG. 3 can correspond to the machine-learned image prediction model 26 of FIG. 1D.

Example Methods

Figure 4:
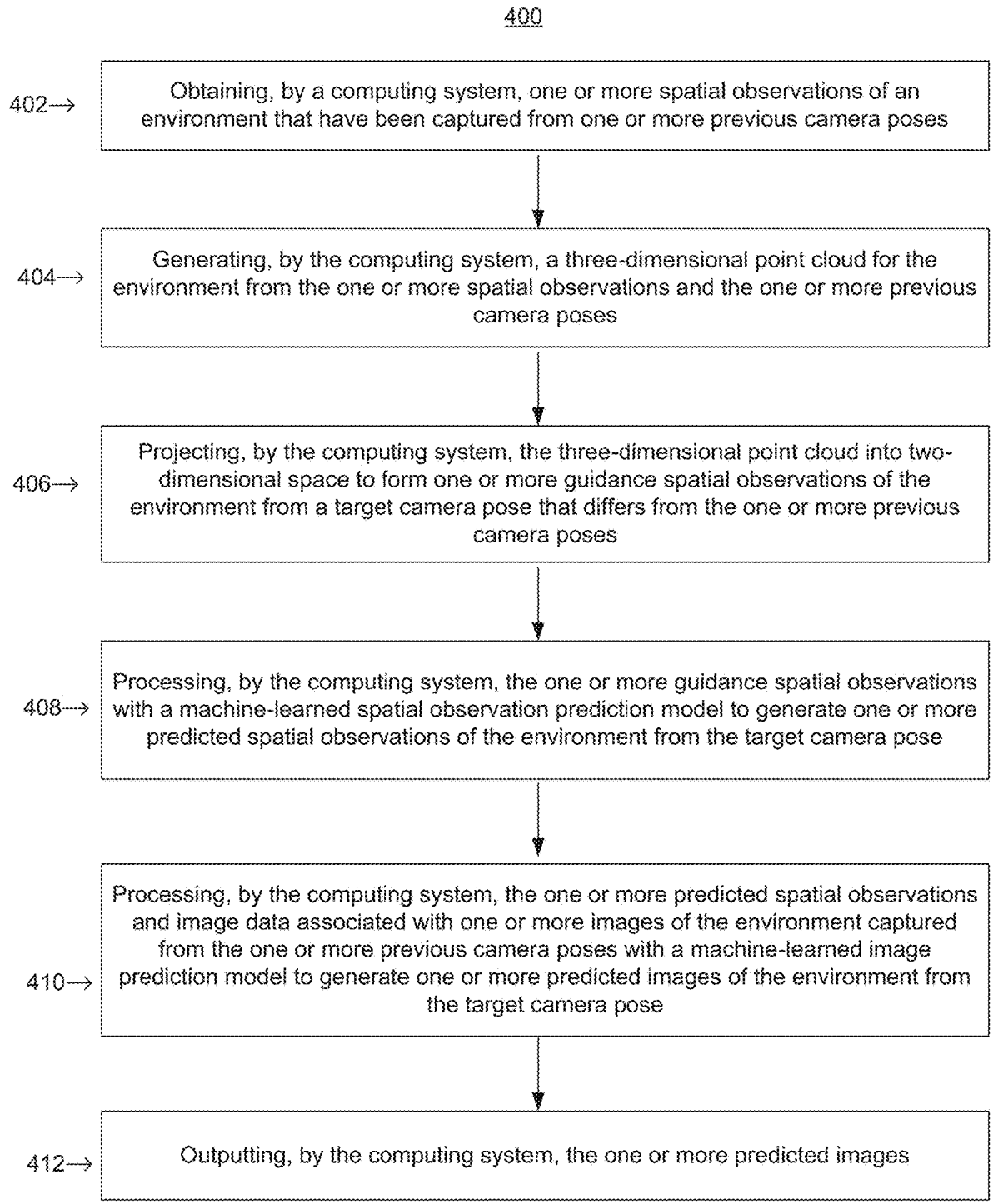
FIG. 4 depicts a flow chart diagram of an example method for generating predicted observations of an environment according to example embodiments of the present disclosure.

FIG. 4 depicts a flow chart diagram of an example method for generating predicted observations of an environment according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure. Observations can include depth observations, semantic segmentation observations, and/or color (e.g., RGB) observations.

At 402, a computing system can obtain one or more spatial observations of an environment that may be captured from one or more previous camera poses. The computing system can obtain one or more spatial observations of an environment from a user device (e.g., a smartphone, laptop, camera, etc.). The computing system can obtain the spatial observations from the user device over a computer network (e.g., the internet).

At 404, the computing system can generate a three-dimensional point cloud for the environment from the one or more spatial observations and the one or more previous camera poses. The three-dimensional point cloud can include data descriptive of semantic segmentation information, depth information, or RGB information.

At 406, the computing system can project the three-dimensional point cloud into two-dimensional space to form one or more guidance spatial observations of the environment from a target camera pose that differs from the one or more previous camera poses.

At 408, the computing system can process the one or more guidance spatial observations with a machine-learned spatial observation prediction model to generate one or more predicted spatial observations of the environment from the target camera pose. Processing the one or more guidance spatial observations with the machine-learned spatial observation prediction model can include processing the one or more guidance spatial observations with an encoder model of the machine-learned spatial observation prediction model. The encoder model may be configured to generate a feature map from the one or more guidance spatial observations. Processing the one or more guidance spatial observations with the encoder model may include inputting a one-hot encoding of the one or more guidance spatial observations to the encoder model to receive the feature map. Processing the one or more guidance spatial observations with the machine-learned spatial observation prediction model can include sampling a latent spatial noise tensor from a noise distribution. The noise distribution can be a multivariate Gaussian distribution. Processing the one or more guidance spatial observations with the machine-learned spatial observation prediction model can include combining the feature map with the latent spatial noise tensor to generate a combined feature set. Processing the one or more guidance spatial observations with the machine-learned spatial observation prediction model can include processing the combined feature set with a decoder model of the machine-learned spatial observation prediction model. The decoder model may be configured to generate the one or more predicted spatial observations of the environment from the target camera pose. The encoder model may provide spatial information to the decoder model utilizing skip connections.

At 410, the computing system can process the one or more predicted spatial observations and image data associated with one or more images of the environment captured from the one or more previous camera poses with a machine-learned image prediction model to generate one or more predicted images of the environment from the target camera pose. The image data associated with the one or more images of the environment captured from the one or more previous camera poses may include a guidance image. The images of the environment may be color (e.g., RGB) images. The guidance image may include one or more images of the environment captured from the one or more previous camera poses projected onto the three-dimensional point cloud from the target camera pose.

At 412, the computing system can output the one or more predicted images. Outputting the one or more predicted images can include transmitting the predicted images over a computing network to a user device (e.g., a smartphone, laptop, etc.).

Figure 5:
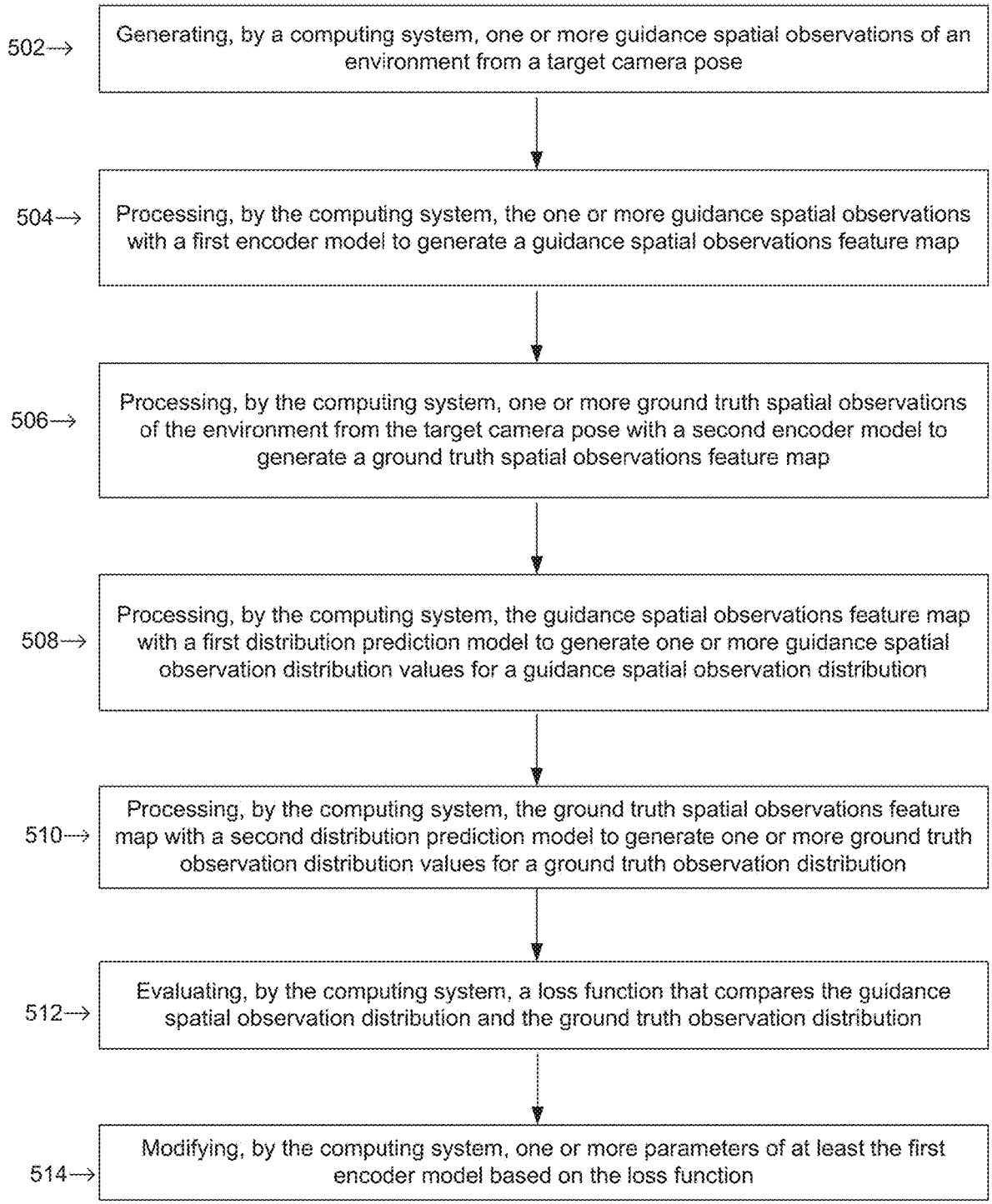
FIG. 5 depicts a flow chart diagram of an example method for learning an improved noise distribution according to example embodiments of the present disclosure.

FIG. 5 depicts a flow chart diagram of an example method for learning an improved noise distribution according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system can generate one or more guidance spatial observations of an environment from a target camera pose. The guidance spatial observations of an environment from a target camera pose can be generated by obtaining one or more spatial observations of the environment that have been captured from one or more previous camera poses that differ from the target camera pose, generating a three-dimensional point cloud for the environment from the one or more spatial observations and the one or more previous camera poses, and projecting the three-dimensional point cloud into two-dimensional space to form the one or more guidance spatial observations of the environment form the target camera pose. The observations can be semantic segmentation observations and/or depth observations.

At 504, the computing system can process the one or more guidance spatial observations with a first encoder model to generate a guidance spatial observations feature map. The first encoder model can receive, as input, a one-hot encoding of the guidance spatial observations.

At 506, the computing system can process one or more ground truth spatial observations of the environment from the target camera pose with a second encoder model to generate a ground truth spatial observations feature map. The second encoder model can receive, as input, a one-hot encoding of the ground truth spatial observations.

At 508, the computing system can process the guidance spatial observations feature map with a first distribution prediction model to generate one or more guidance spatial observation distribution values for a guidance spatial observation distribution. In some implementations, the first distribution prediction model is a convolutional neural network. In some examples, the guidance spatial observation distribution is a multivariate Gaussian distribution.

At 510, the computing system can process the ground truth spatial observations feature map with a second distribution prediction model to generate one or more ground truth observation distribution values for a ground truth observation distribution. In some implementations, the second distribution prediction model is a convolutional neural network. In some examples, the ground truth observation distribution is a multivariate Gaussian distribution.

At 512, the computing system can evaluate a loss function (e.g., a KL-divergence loss function) that compares the guidance spatial observation distribution and the ground truth observation distribution.

At 514, the computing system can modify one or more parameters of at least the first encoder model based on the loss function. In some implementations, the computing system can modify parameters of the second encoder model. Additionally, or alternatively, the computing system can modify parameters of the first distribution prediction model and/or second distribution prediction model.

Figure 6:
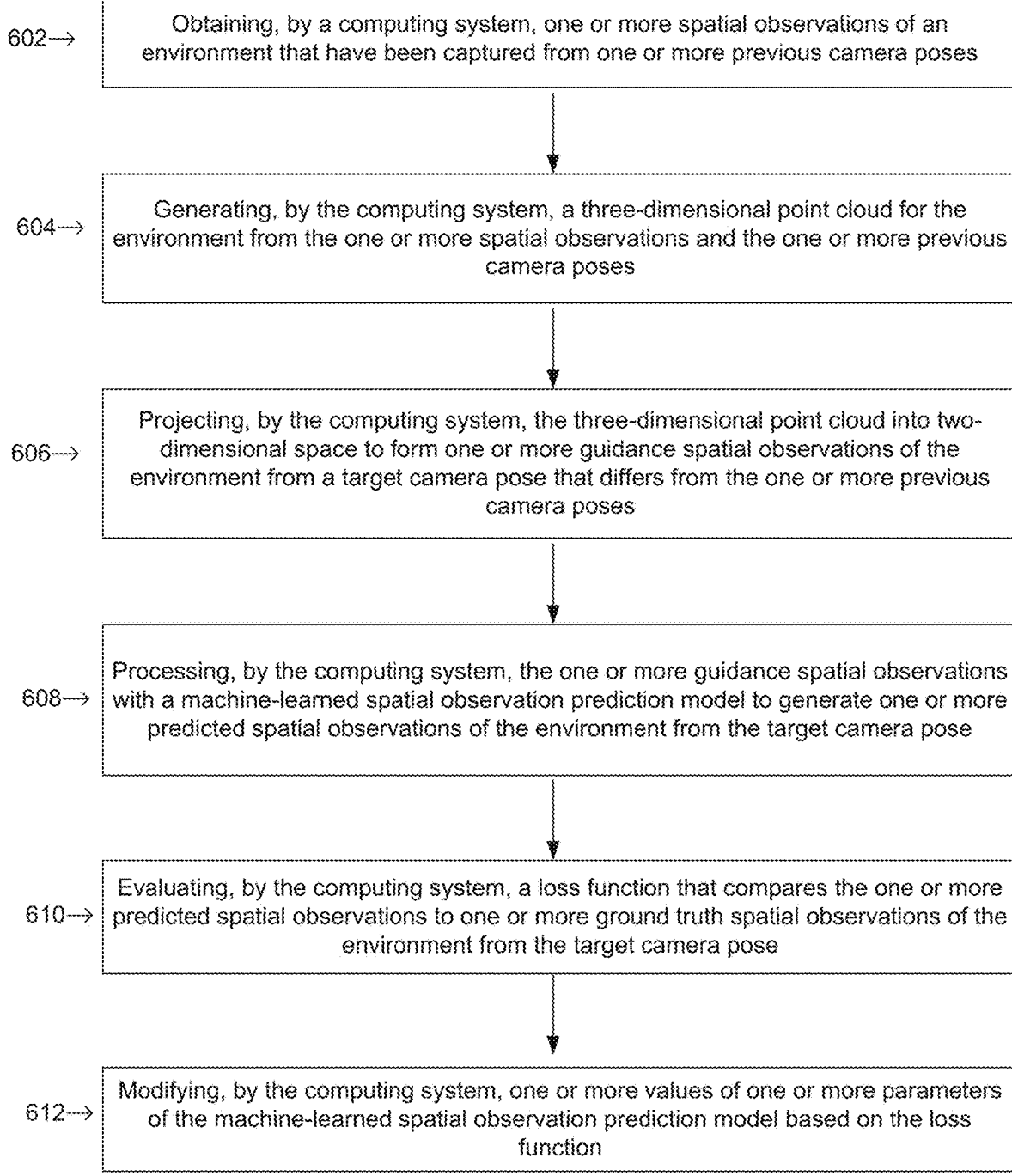
FIG. 6 depicts a flow chart diagram of an example method for training a machine-learned spatial observation prediction model according to example embodiments of the present disclosure.

FIG. 6 depicts a flow chart diagram of an example method for training a machine-learned spatial observation prediction model. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure At 602, a computing system can obtain one or more spatial observations of an environment that have been captured from one or more previous camera poses. The spatial observations can include semantic segmentation observations and/or depth observations.

At 604, the computing system can generate a three-dimensional point cloud for the environment from the one or more spatial observations and the one or more previous camera poses.

At 606, the computing system can project the three-dimensional point cloud into two-dimensional space to form one or more guidance spatial observations of the environment from a target camera pose that differs from the one or more previous camera poses.

At 608, the computing system can process the one or more guidance spatial observations with a machine-learned spatial observation prediction model to generate one or more predicted spatial observations of the environment from the target camera pose.

At 610, the computing system can evaluate a loss function (e.g., a KL-divergence loss function) that compares the one or more predicted spatial observations to one or more ground truth spatial observations of the environment from the target camera pose.

At 612, the computing system can modify one or more values of one or more parameters of the machine-learned spatial observation prediction model (e.g., encoder, decoder, distribution prediction model, noise tensor, etc.) based on the loss function.

Figure 7:
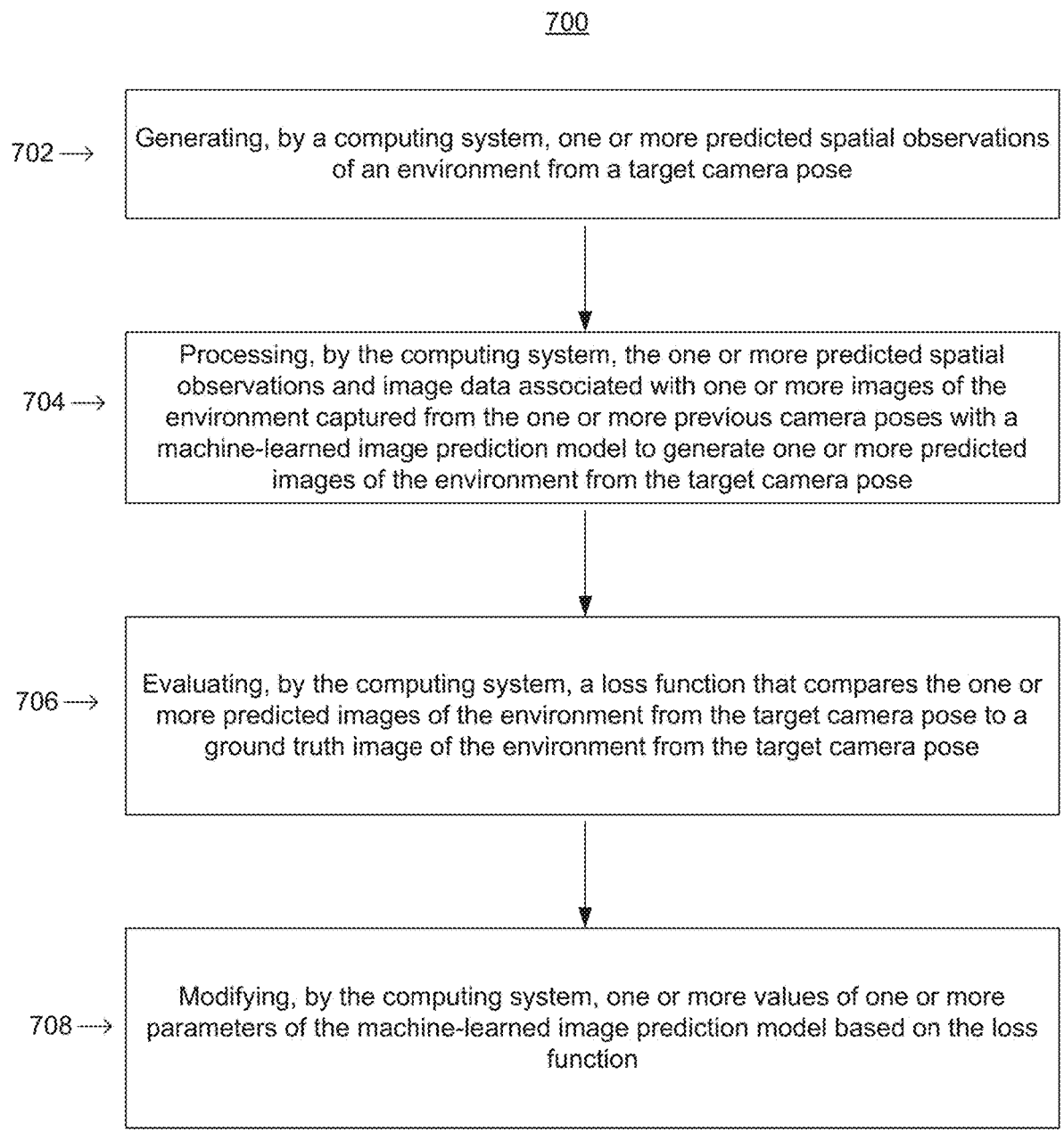
FIG. 7 depicts a flow chart diagram of an example method for training a machine-learned image prediction model according to example embodiments of the present disclosure.

FIG. 7 depicts a flow chart diagram of an example method for training a machine-learned image prediction model according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can generate one or more predicted spatial observations of an environment (e.g., predicted depth observations and/or predicted semantic segmentation observations) from a target camera pose. The computing system can generate the predicted spatial observations via the systems and methods described herein.

At 704, the computing system can process the one or more predicted spatial observations and image data associated with one or more images (e.g., RGB images) of the environment captured from the one or more previous camera poses with a machine-learned image prediction model to generate one or more predicted images (e.g., RGB images) of the environment from the target camera pose. The machine-learned image prediction model can include one or more convolution blocks, and/or one or more image synthesis layers. The image synthesis layers can be configured to receive data from the one or more convolution blocks.

At 706, the computing system can evaluate a loss function that compares the one or more predicted images of the environment from the target camera pose to a ground truth image of the environment from the target camera pose. The loss function can include a hinge loss function, a feature matching loss function, and/or a perceptual loss function.

At 708, the computing system can modify one or more values of one or more parameters of the machine-learned image prediction model (e.g., convolution blocks, image synthesis layers) based on the loss function.

Example Experimental Results

Example implementations of the present disclosure tested the proposed systems and methods on a number of real-world environments. Particularly, the proposed systems and methods were tested on indoor environments. Representative images from various points in the visual world model are shown in FIGS. 8A-8J.

Figure 8A:
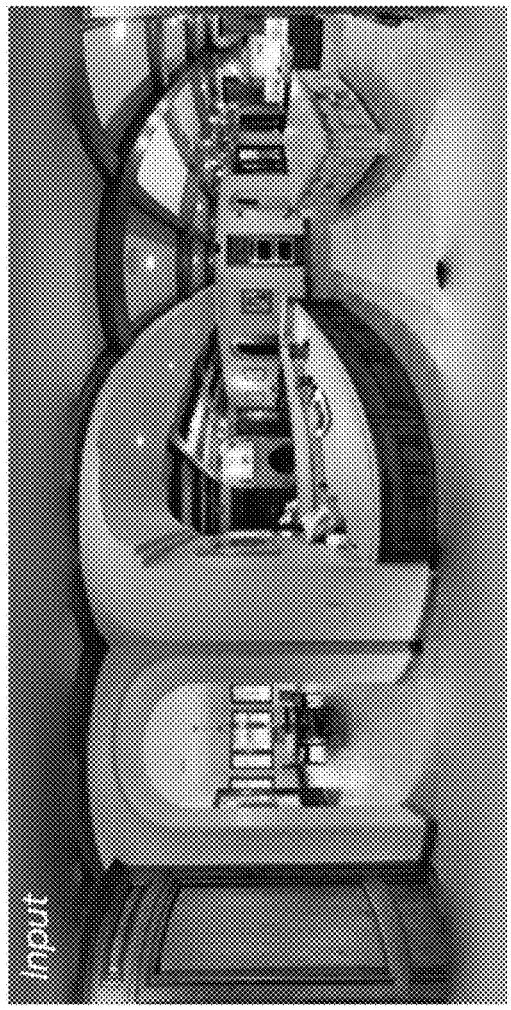
FIGS. 8A-C depict example input observations according to example embodiments of the present disclosure.

FIG. 8A illustrates an example input RGB image of an indoor environment captured from a previous camera pose.

Figure 8B:
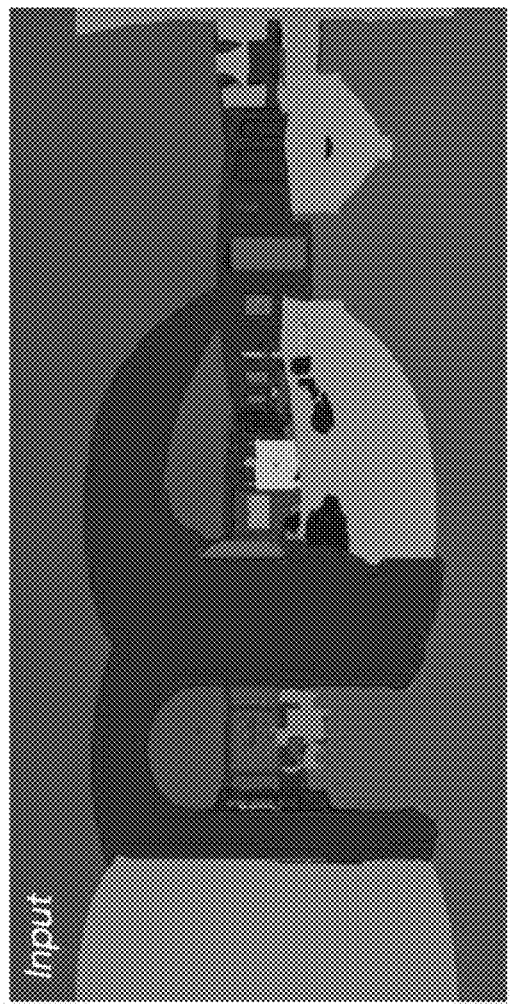
Figure 8C:
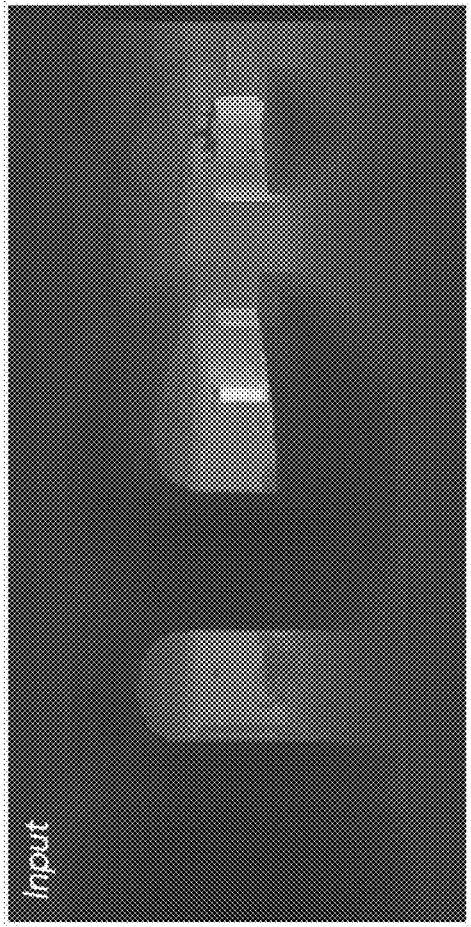

FIGS. 8B and 8C illustrate a corresponding input semantic segmentation image and depth image, respectively, of the indoor environment captured from the same previous camera pose.

Figure 8D:
FIG. 8D depicts an example three-dimensional point cloud according to example embodiments of the present disclosure.

FIG. 8D illustrates an example three-dimensional point cloud of the environment illustrated in FIG. 8A-C.

Figure 8E:
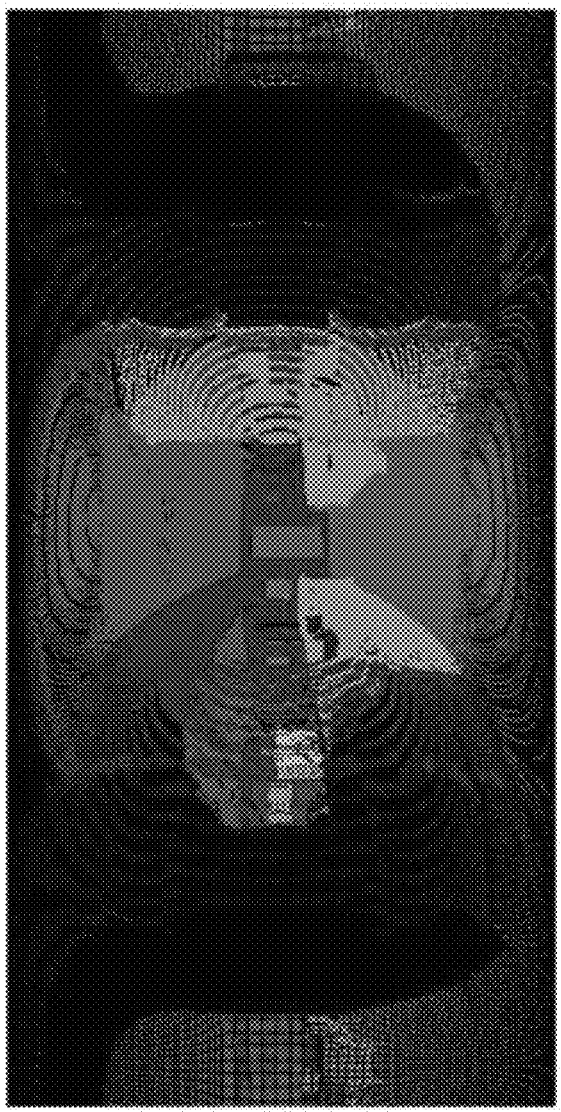
FIGS. 8E-F depict example guidance observations according to example embodiments of the present disclosure.
Figure 8F:
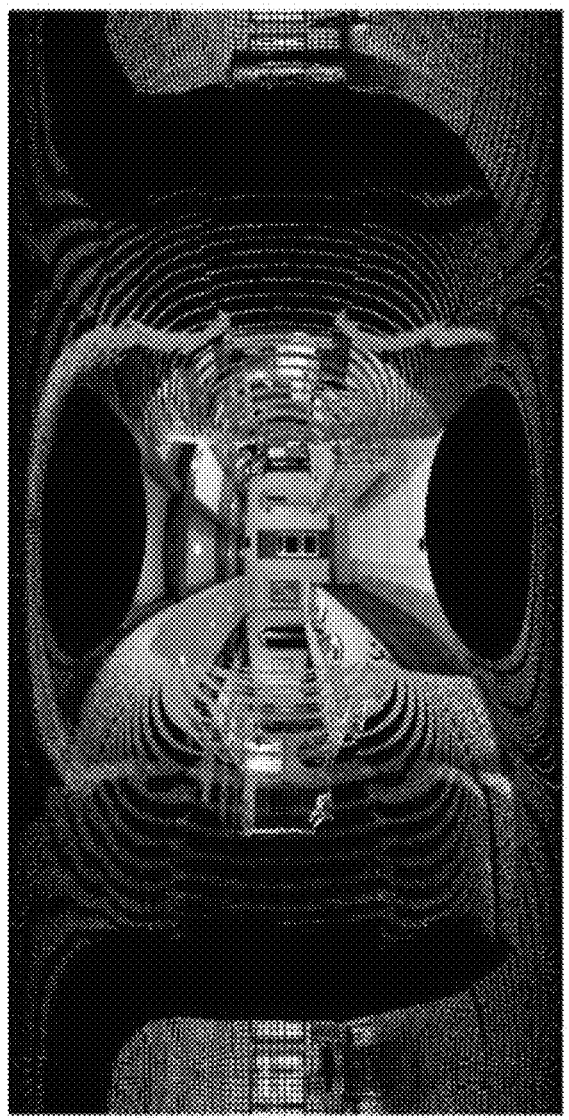

FIGS. 8E-F illustrate example guidance observations (semantic segmentation and RGB, respectively) generated by projecting the three-dimensional point cloud of FIG. 8D into two-dimensional space from a target camera pose that differs from the previous camera pose of FIGS. 8A-C.

FIG. 8G illustrates an example predicted semantic segmentation observation generated by processing the semantic segmentation guidance image illustrated in FIG. 8E with the first stage of the visual world model described herein.

FIG. 8H illustrates an example predicted depth observation generated by processing the semantic segmentation guidance image illustrated in FIG. 8E with the first stage of the visual world model described herein.

FIG. 8I illustrates an example predicted RGB image generated by processing the RGB guidance image illustrated in FIG. 8F and the predicted observations of FIGS. 8G and 8H with the second stage of the visual world model described herein.

FIG. 8J illustrates an example ground truth RGB image of the environment from the target pose.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for generating predicted images along a trajectory of unseen viewpoints, the computing system comprising:
one or more processors; and
one or more non-transitory computer-readable media that collectively store instructions that, when executed by the one or more processors, cause the computing system to perform operations, the operations comprising:
obtaining one or more spatial observations of an environment that have been captured from one or more previous camera poses;
generating a three-dimensional point cloud for the environment from the one or more spatial observations and the one or more previous camera poses;
projecting the three-dimensional point cloud into two-dimensional space to form one or more guidance spatial observations of the environment from a target camera pose that differs from the one or more previous camera poses;
processing the one or more guidance spatial observations with a machine-learned spatial observation prediction model to generate one or more predicted spatial observations of the environment from the target camera pose, wherein processing the one or more guidance spatial observations comprises:
processing the one or more guidance spatial observations with an encoder model of the machine-learned spatial observation prediction model, wherein the encoder model is configured to generate a feature map from the one or more guidance spatial observations;
sampling, a latent spatial noise tensor from a noise distribution;
combining, the feature map with the latent spatial noise tensor to generate a combined feature set; and
processing the combined feature set with a decoder model of the machine-learned spatial observation prediction model, wherein the decoder model is configured to generate the one or more predicted spatial observations of the environment from the target camera pose;
processing the one or more predicted spatial observations and image data associated with one or more images of the environment captured from the one or more previous camera poses with a machine-learned image prediction model to generate one or more predicted images of the environment from the target camera pose; and
outputting the one or more predicted images.

2. The computing system of claim 1, wherein the one or more spatial observations comprises one or more spatial depth images, the one or more guidance spatial observations comprises one or more guidance depth images, and the one or more predicted spatial observations comprises one or more predicted depth images.

3. The computing system of claim 1, wherein the one or more spatial observations comprises one or more spatial semantic segmentation images, the one or more guidance spatial observations comprises one or more guidance semantic segmentation images, and the one or more predicted spatial observations comprises one or more predicted semantic segmentation images.

4. The computing system of claim 1 wherein processing, the one or more guidance spatial observations with the encoder model comprises inputting a one-hot encoding of the one or more guidance spatial observations to the encoder model to receive the feature map.

5. The computing system of claim 1, wherein the noise distribution is a multivariate Gaussian distribution.

6. The computing system of claim 1 wherein the encoder model provides spatial information to the decoder model utilizing skip connections.

7. The computing system of claim 1, wherein the image data associated with the one or more images of the environment captured from the one or more previous camera poses comprises:
a guidance image comprising the one or more images of the environment captured from the one or more previous camera poses projected onto the three-dimensional point cloud from the target camera pose.

8. A computer-implemented method for generating predicted images along a trajectory of unseen viewpoints, the method comprising:
obtaining one or more spatial observations of an environment that have been captured from one or more previous camera poses;
generating, by a computing system, one or more guidance spatial observations of an environment from a target camera pose;
processing, by the computing system, the one or more guidance spatial observations with a machine-learned spatial observation prediction model to generate one or more predicted spatial observations of the environment from the target camera pose, wherein processing the one or more guidance spatial observations comprises:
processing the one or more guidance spatial observations with an encoder model of the machine-learned spatial observation prediction model, wherein the encoder model is configured to generate a feature map from the one or more guidance spatial observations;

sampling, a latent spatial noise tensor from a noise distribution;

combining, the feature map with the latent spatial noise tensor to generate a combined feature set and processing the combined feature set with a decoder model of the machine-learned spatial observation prediction model, wherein the decoder model is configured to generate the one or more predicted spatial observations of the environment from the target camera pose;

processing the one or more predicted spatial observations and image data associated with one or more images of the environment captured from the one or more previous camera poses with a machine-learned image prediction model to generate one or more predicted images of the environment from the target camera pose; and outputting the one or more predicted images.

9. The computer-implemented method of claim 8, wherein generating, by the computing system, the one or more guidance spatial observations of the environment from the target camera pose comprises:

generating, by the computing system, a three-dimensional point cloud for the environment from the one or more spatial observations and the one or more previous camera poses; and projecting, by the computing system, the three-dimensional point cloud into two-dimensional space to form the one or more guidance spatial observations of the environment from target camera pose.

10. The computer-implemented method of claim 8, wherein processing, by the computing system, the one or more guidance spatial observations comprises inputting, by the computing system, a one-hot encoding of the one or more guidance spatial observations to the encoder model to generate a guidance spatial observations feature map.

11. The computer-implemented method of claim 8, wherein the machine-learned spatial observation prediction model comprises a first convolutional neural network and the machine-learned image prediction model comprises a second convolutional neural network.

12. A computer-implemented method for training a machine-learned spatial observation prediction model, the method comprising:

obtaining, by a computing system, one or more spatial observations of an environment that have been captured from one or more previous camera poses;

generating, by the computing system, a three-dimensional point cloud for the environment from the one or more spatial observations and the one or more previous camera poses;

projecting, by the computing system, the three-dimensional point cloud into two-dimensional space to form one or more guidance spatial observations of the environment from a target camera pose that differs from the one or more previous camera poses;

processing, by the computing system, the one or more guidance spatial observations with a machine-learned spatial observation prediction model to generate one or more predicted spatial observations of the environment from the target camera pose, wherein processing the one or more guidance spatial observations comprises:

processing the guidance spatial observations with an encoder model of the machine-learned spatial observation prediction model, wherein the encoder model is configured to generate a feature map from the one or more guidance spatial observations;

sampling, a latent spatial noise tensor from a noise distribution;

combining, the feature map with the latent spatial noise tensor to generate a combined feature set; and processing the combined feature set with a decoder model of the machine-learned spatial observation prediction model, wherein the decoder model is configured to generate the one or more predicted spatial observations of the environment from the target camera pose;

evaluating, by the computing system, a loss function that compares the one or more predicted spatial observations to one or more ground truth spatial observations of the environment from the target camera pose; and modifying, by the computing system, one or more values of one or more parameters of the machine-learned spatial observation prediction model based on the loss function.

13. The computer-implemented method of claim 12, wherein the one or more spatial observations comprises one or more depth observations, and the loss function comprises a mean absolute error function that evaluates the one or more depth observations to generate a mean absolute error.

14. The computer-implemented method of claim 12, wherein the one or more spatial observations comprises one or more semantic segmentation observations, and the loss function comprises a cross entropy loss function that evaluates the one or more semantic segmentation observations to generate a cross entropy loss.

15. A computer-implemented method for training a machine-learned image prediction model, the method comprising:

generating, by a computing system, one or more predicted spatial observations of an environment from a target camera pose, wherein generating the one or more predicted spatial observations comprises:

processing one or more guidance spatial observations with an encoder model, wherein the encoder model is configured to generate a feature map from the one or more guidance spatial observations;

sampling, a latent spatial noise tensor from a noise distribution;

combining, the feature map with the latent spatial noise tensor to generate a combined feature set; and processing the combined feature set with a decoder model, wherein the decoder model is configured to generate the one or more predicted spatial observations of the environment from the target camera pose;

processing, by the computing system, the one or more predicted spatial observations and image data associated with one or more images of the environment captured from the one or more previous camera poses with a machine-learned image prediction model to generate one or more predicted images of the environment from the target camera pose;

evaluating, by the computing system, a loss function that compares the one or more predicted images of the environment from the target camera pose to a ground truth image of the environment from the target camera pose; and modifying, by the computing system, one or more values of one or more parameters of the machine-learned image prediction model based on the loss function.

16. The computer-implemented method of claim 15, wherein the machine-learned image prediction model comprises:
  one or more convolution blocks; and
  one or more image synthesis layers, wherein the one or more image synthesis layers is configured to receive data from the one or more convolution blocks.

17. The computer-implemented method of claim 15, wherein the loss function comprises:
  a hinge loss function;
  a feature matching loss function; or
  a perceptual loss function.

* * * * *